Patented Aug. 22, 1944

2,356,501

UNITED STATES PATENT OFFICE 2,356,501

CARRYING AGENT FOR SPICE OILS AND PROCESS OF PREPARING SAME

Robert O. Brown and Chastain G. Harrel, Minneapolis, Minn., assignors to Pillsbury Flour Mills Company, Minneapolis, Minn., a corporation of Delaware No Drawing. Application November 20, 1942, Serial No. 466,364

4 Claims. (Cl. 99—140)

This invention relates to synthetic spices, carrying agents for spice oils and to processes for preparing such synthetic spices and carrying agents for spice oils.

It is one of the objects of this invention to provide a novel and improved spice oil carrying agent which will have the characteristic color, appearance and texture of the natural ground spice.

A further object is to provide such a carrying agent which will have good keeping qualities so that it will not readily become rancid.

Another object is to provide a novel and inexpensive process for preparing such a carrying agent to give the carrying agent all the qualities above mentioned.

A further object is to produce a novel synthetic spice closely resembling in color, physical appearance, taste and odor, a natural spice.

Another object is to provide a novel process for preparing such a synthetic spice.

The objects and advantages of the invention will more fully appear from the following description wherein our products and processes of preparing the same are fully described.

In accordance with our invention to prepare a carrying agent for spice oils a quantity of a cereal grain product approaching the fineness of flour is placed in a closed container, the air is exhausted from the container, either by introduction of live steam therein and exhaust of some of the steam therefrom, or else by suction, and the cereal grain product while being agitated is cooked under steam pressure at relatively low temperature out of the presence of free oxygen at such pressure and for such period of time as to caramelize or partially caramelize the natural sugars in the cereal grain product without substantial oxidation of the fats of the cereal grain product, causing the cereal grain product to take on a reddish brown cast corresponding in color with the ground natural spice, the oils of which, or oils simulating which are to be added to the carrying agent.

For example: To produce a carrying agent for cinnamon tasting spice oils 600 pounds of a dark rye flour is initially placed in a steam jacketed steam pressure cooker and the jacket of the cooker before the cooker is closed is brought up to 32 pounds steam pressure, i. e., to a temperature of 276° F., while the rye flour is being agitated. The pressure cooker is then closed and either the air is substantially exhausted therefrom by vacuum or it is substantially exhausted by introducing live steam into the cooker and exhausting some of the steam therefrom to carry the air out of the cooker with the exhausted steam. In either case live steam, and preferably saturated steam will be employed in the cooker after the air is substantially exhausted therefrom. The internal pressure of the cooker while the rye flour is being agitated is then gradually increased to approximately 27½ pounds, i. e., 270° F., it taking from twenty to twenty-five minutes under the conditions stated to bring the internal pressure up to 27½ pounds. Thereafter, while the rye flour is still being agitated the rye flour is heated for a further period of seventy-five to eighty minutes with the internal steam pressure of the cooker at approximately 27½ pounds. In other words, the entire heat treatment is continued for approximately one hour and forty minutes. During this time the natural sugars found in the dark rye flour are caramelized or partially caramelized so that the rye flour takes on a reddish brown cast having the appearance of natural ground cinnamon spice. The steam is then exhausted from the internal chamber of the pressure cooker and the material is agitated at atmospheric pressure for approximately fifteen minutes while the jacket heat is maintained. The product is then removed from the pressure cooker whereupon it is cooled and sieved to definite size. This produces the carrying agent for the cinnamon tasting spice oils.

After the carrying agent has been prepared either synthetic or natural spice oils are added to the carrying agent and mixed therewith to produce a product closely resembling the natural spice in appearance, color, odor and taste. When cinnamon spice is to be prepared either natural cinnamon oils or synthetic cinnamon oils may be added to the carrying agent prepared in accordance with the above description given in the example cited.

The time of steam pressure treatment out of the presence of substantial quantities of air or free oxygen and the pressure employed in this treatment will vary considerably depending upon the particular cereal grain product approaching the fineness of flour used, the quantity of natural sugars present in such product, and the desired color of the carrying agent to be obtained. Dark rye flour is particularly adaptable for use in making a synthetic cinnamon spice inasmuch as a water extract of treated dark rye flour closely resembles the water extract of natural cinnamon in physical appearance. Also rye flour has a natural sugar content greater than wheat flour and rye flour is somewhat lighter than wheat flour, and as a result a lighter carrying agent is secured than what is obtained with wheat flour. This is advantageous because, as the ultimate synthetic cinnamon spice is used, for example, in making baked products, the synthetic spice will not settle to the bottom of the baked product as it is being prepared or as it is being cooked.

It is, of course, possible to use other cereal grain products approaching the fineness of flour than dark rye flour. Thus, for example, cereal grain products ground to the necessary fineness and made from durum wheat, ordinary wheat, soy beans, corn, oats, buckwheat, barley and other cereal grains can be employed. Flours and flour like products made from certain cereal grains have advantages over others for use in producing carrying agents for particular spice oils inasmuch as the ultimate carrying agents produced from such cereal grain products may be caused by our treatment to take on different color characteristics.

To produce carrying agents having lighter colored characteristics the steam treatment is either carried on for shorter periods or at lower temperatures, while to produce carrying agents having darker colors the steam treatment is carried on either for longer time periods or at higher temperatures. By varying the time of steam pressure treatment or by varying the pressure employed in the steam pressure treatment, it is possible to secure carrying agents for use in preparing synthetic spices of various types. Thus, for example, it is possible to produce carrying agents for either natural or synthetic spice oils which will have the same general appearance as ground nutmeg, all spice, sage, etc., and which when spice oils are added thereto will have approximately the same appearance, taste and odor as such respective spices.

The purpose in exhausting the air during the preparation of the carrying agent is to prevent substantial oxidation of the cereal grain product employed while the same is being subjected to the heat treatment. By reason of the fact that the carrying agent is not materially oxidized, the carrying agent will keep for a long period of time without growing rancid. On the other hand when a cereal grain product is heated in an ordinary oven exposed in the open air to the temperatures required for the darkening or caramelization of the sugars, rapid oxidation of the fats present in the cereal grain product takes place, and the carrying agent thus prepared rapidly grows rancid. If ordinary wheat is employed in making the carrying agent preferably streams (specific portions of the grain berry) during the milling process of the wheat are used which are high in sugar content.

In the heat treatment out of the presence of free oxygen of the cereal grain product approaching the fineness of flour, moisture is required for the caramelization of the sugars at relatively low temperatures and the steam employed supplies this moisture, it being preferable to use a saturated steam when a bright life-like colored carrying agent is desired, and a wet steam if a dull colored carrying agent is desired. The amount of moisture present in the steam largely determines the relative brightness of the resulting product.

The carrying agent has a bland taste which does not reflect in the synthetic spice made therefrom due to the strong taste of the spice oil used.

Depending on what synthetic spice is to be made and what cereal grains are employed, it is possible to vary the internal pressure in the pressure cooker from 10 to 30 pounds and to vary the steam exposure treatment from one hour to five hours. Within the limits specified comparable results may be obtained by raising or lowering the steam pressure and conversely shortening or lengthening the period of treatment.

It will, of course, be understood that various changes may be made in the processes and in the steps thereof and in the ingredients employed in producing the products without departure from the scope of the present invention which generally stated consists in the matter described and set forth in the appended claims.

What is claimed is:

1. The process of preparing a synthetic spice which consists in heating under steam pressure in a closed chamber, a cereal grain product approaching the fineness of flour and simultaneously excluding air from said chamber until the natural sugars of the cereal grain product have been caramelized, cooling the caramelized cereal grain product and thereafter adding a spice oil thereto.

2. The process of preparing a synthetic spice which consists in heating and simultaneously agitating under steam pressure in a closed chamber from which free oxygen is substantially excluded, a cereal grain product approaching the fineness of flour until the natural sugars therein have been caramelized, cooling such caramelized cereal grain product and adding a spice oil thereto.

3. The process of preparing a synthetic spice which consists in heating under steam pressure in a closed chamber from which free oxygen is substantially excluded a dark rye flour until the natural sugars of the flour have been caramelized, cooling the caramelized dark rye flour and thereafter adding a spice oil thereto.

4. The process of preparing a synthetic cinnamon spice which consists in heating under steam pressure in a closed chamber from which free oxygen is substantially excluded a dark rye flour until the natural sugars of the flour have been caramelized, cooling the caramelized dark rye flour and thereafter adding to the caramelized dark rye flour a cinnamon tasting spice oil.

ROBERT O. BROWN.
CHASTAIN G. HARREL.